(12) United States Patent
Yeh

(10) Patent No.: US 6,513,786 B1
(45) Date of Patent: Feb. 4, 2003

(54) MOLD MOTHER PLATE FORMING WITH DESIRED PATTERN

(75) Inventor: Chwei-Jing Yeh, Sanchung (TW)

(73) Assignee: Ritek Corporation, Hsin Chu (TW)

( * ) Notice: Subject to any disclaimer, the term of this patent is extended or adjusted under 35 U.S.C. 154(b) by 58 days.

(21) Appl. No.: 09/722,672

(22) Filed: Nov. 28, 2000

(51) Int. Cl.$^7$ .......................... B41B 11/62; B22D 33/04
(52) U.S. Cl. ..................... 249/104; 164/340; 164/137
(58) Field of Search ............................. 164/340, 137; 425/192 R; 249/104, 102

(56) References Cited

U.S. PATENT DOCUMENTS

| | | | | |
|---|---|---|---|---|
| 4,126,291 A | * | 11/1978 | Gilbert et al. | 249/63 |
| 4,666,735 A | * | 5/1987 | Hoover et al. | 427/43.1 |
| 5,160,752 A | * | 11/1992 | Urayama et al. | 425/577 |
| 5,840,228 A | * | 11/1998 | Ritchey | 264/132 |
| 6,328,549 B1 | * | 12/2001 | Valyi et al. | 425/112 |

* cited by examiner

Primary Examiner—Tom Dunn
Assistant Examiner—I. H. Lin
(74) Attorney, Agent, or Firm—Rosenberg, Klein & Lee

(57) ABSTRACT

A mold structure includes an upper mold and a lower mold. The upper mold is installed with an upper mold core, and the lower mold is installed with a lower mold core. A mold cavity is formed between the upper mold core and lower mold core. A mother plate disposed in the mold cavity is replaceably coupled to one of the mold cores. The mother plate includes a glass substrate with a metal film thereon. The metal film defines a pattern that is transferred to the plastic material molded in the mold cavity.

2 Claims, 5 Drawing Sheets

MOLD MOTHER PLATE FORMING WITH DESIRED PATTERN

FIELD OF THE INVENTION

The present invention relates to a mold mother plate, and especially to a mold mother plate which is replaceable with different patterns on the panel so that the shaped products have various patterns.

BACKGROUND OF THE INVENTION

Referring to FIG. 1, the prior art shaped mold is illustrated for forming products, such as an optic disk. The mold includes an upper mold 10a and a lower mold 11a. The upper mold 10a and lower mold 11a are installed with an upper mold core 12a and a lower mold core 13a, respectively. The upper mold core 12a and lower mold core 13a are varied with the shaped product. Furthermore, a sprinkling path system 14a are installed on the lower mold core 13a and a mold cavity 15a are formed between the upper mold core 12a and the lower mold core 13a. The upper mold 10a and lower mold 11a are clamped by a proper mold clamping device (not shown) so as to be combined. Then melt plastics is filled from the sprinkling path system 14a to the mold cavity 15a so that the plastics are formed with a desired shape.

In general, a formed product is disposed with trademark, advertising patterns, and others. The pattern is varied as required. Therefore, a small mold core 16a are installed between the upper mold core 12a and lower mold 11a. At one end of the small mold core 16a adjacent to one end of the mold cavity 15a is installed with a pattern panel so that as the plastics are shaped, a desired pattern is formed at a respective place. Since the small mold core 16a is a replaceable design, the pattern panel thereof is replaceable as desired so that the product has different pattern without needing replacing the whole upper mold core 12a and lower mold core 13a.

However, in the aforesaid prior art design, the manufacturing of the small mold core 16a is time and labor-consumed and much material is necessary. Thus, the cost can not be reduced. Furthermore, the small mold core 16a is difficult to be assembled to the upper mold core 12a. It is necessary to detach the upper mold core 12a for placing the small mold core 16a therein. Much labor is necessary and thus, cost is high and is not economical.

Therefore, the aforesaid prior art has some defects necessary to be improved.

SUMMARY OF THE INVENTION

Accordingly, the primary object of the present invention is to provide a mold mother plate forming with desired pattern, wherein the mother plate is made by sputtering or plating with a lower material cost and can be manufactured easily.

Another object of the present invention is to provide a mold mother plate forming with desired pattern, wherein the mother plate is installed on the surface of an upper mold core or a lower mold core. The assembly is easy and cost can be saved so that the cost is reduced greatly.

To achieve the object, the present invention provides a mold mother plate forming with desired patterns, comprising a mold having at least one mold core and having mold cavity, The at least one mold core is formed with a mother plate. The mother plate includes a glass substrate. The mother plate is a metal film with a pattern panel; the mother plate is replaceably installed to the mold core, and the metal film is installed in the mold cavity.

The various objects and advantages of the present invention will be more readily understood from the following detailed description when reading in conjunction with the appended drawing.

DETAILED DESCRIPTION OF THE PREFERRED EMBODIMENTS

Figure 1:
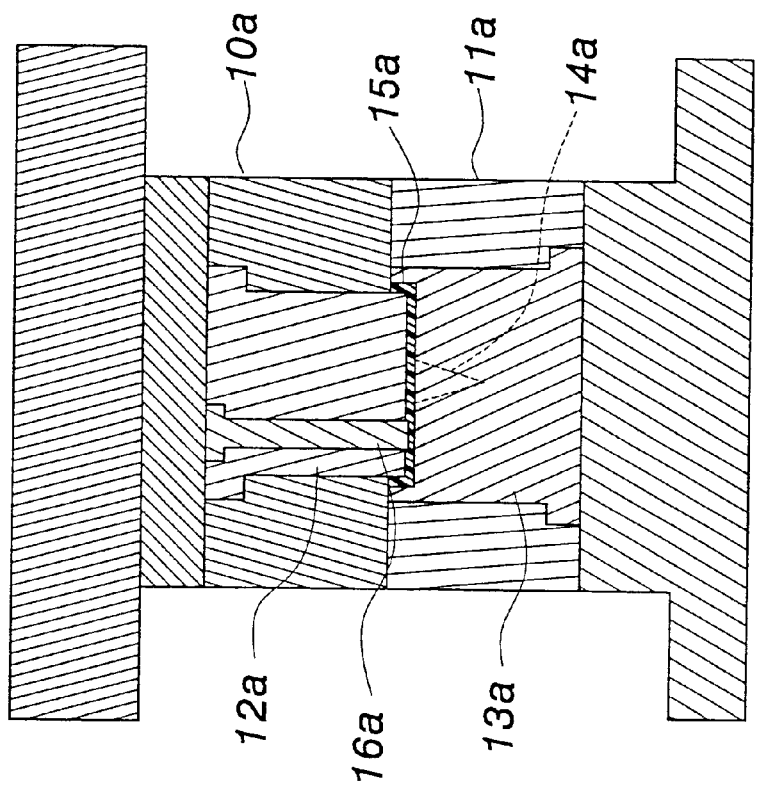
FIG. 1 is a schematic cross sectional view of a prior art mold.
Figure 2:
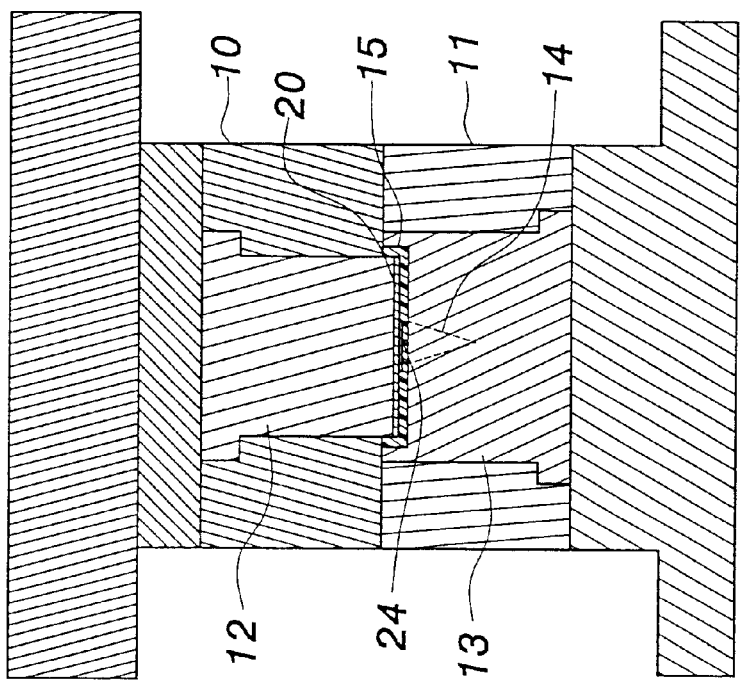
FIG. 2 is a schematic cross sectional view of the mold in the present invention.

Referring to FIG. 2, a schematic cross sectional view of the mold according to the present invention is illustrated herein. In the present invention, a mold mother plate which is capable of generating any pattern is provided, the mold includes an upper mold 10, and a lower mold 11. The upper mold 10 and lower mold 11 are installed with an upper mold core 12 and a lower mold core 13, respectively. The lower mold core 13 (or upper mold core 12) are installed with a sprinkling path system 14. A mold cavity 15 is formed between the upper mold core 12 and the lower mold core 13. The upper mold 10 and lower mold 11 can be driven by a suitable mold clamping unit (not shown) for combining together. Then filler material is filled into the mold cavity 15 along the sprinkling path system 14 so that the filler material is shaped as a desired shape. Since the structure of the mold is a prior art and not within the scope of the present invention, thus the details will not be further described herein.

Figure 4:
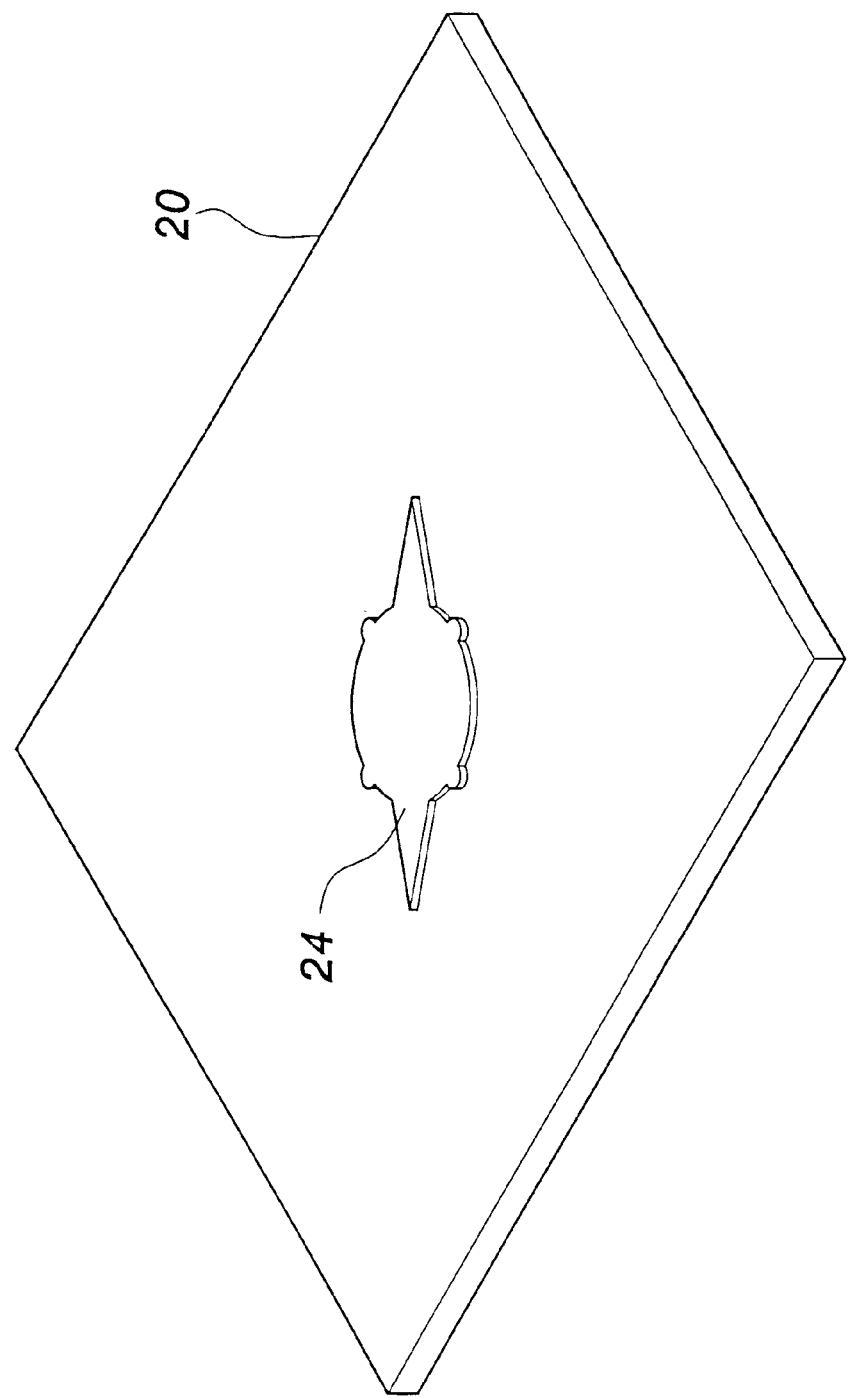
FIG. 4 is a schematic perspective view of the mold mother plate in the present invention.

In the present invention, the upper mold core 12 (or lower mold core 13) are installed with a mother plate 20 (see FIG. 4). The mother plate 20 is replaceably embedded, or buckled, or screwedly connected to the upper mold core 12. The metal film mother plate 20 is placed in the mold cavity 15.

Figure 3A:
FIG. 3A is a first schematic cross sectional view for the shaping of a mold mother plate in the present invention.
Figure 3B:
FIG. 3B is a second schematic cross sectional view for the shaping of a mold mother plate in the present invention.
Figure 3C:
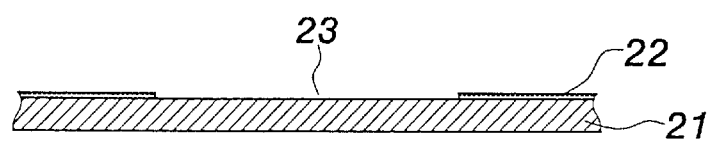
FIG. 3C is a third schematic cross sectional view for the shaping of a mold mother plate in the present invention.
Figure 3D:
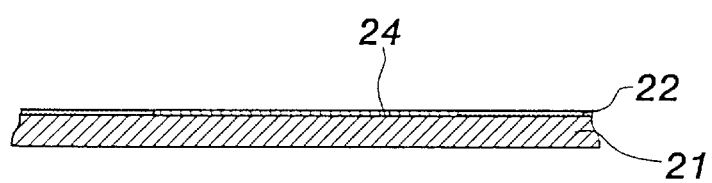
FIG. 3D is a fourth schematic cross sectional view for the shaping of a mold mother plate in the present invention.
Figure 3E:
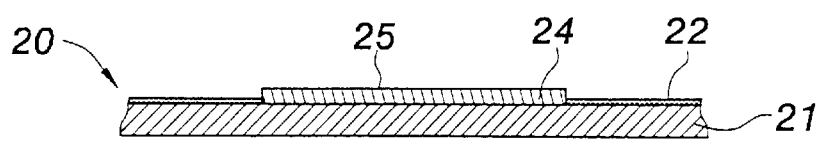
FIG. 3E is a fifth schematic cross sectional view for the shaping of a mold mother plate in the present invention.

Referring to FIGS. 3A to 3E, a schematic view showing the shaping of the mother plate mold in the present invention is illustrated. The shaping of the mother plate 20 has the following steps:

(a) preparing a glass substrate 21 (see FIG. 3A);

(b) coating a developer 22 on the glass substrate 21 (see FIG. 3B);

(c) emitting a laser light to the developer 22, by a laser light, etching a section 23 for the desired pattern (see FIG. 3C);

(d) sputtering a layer of chromium and other metal film 24 on the section 23 for the desired pattern as a conductive medium;

(e) placing the glass substrate 21 with metal film 24 in a plating tank for plating and thus widening the thickness of the metal film 24, therefore, metal film 24 is formed as a patterned surface; and thus a mold mother plate 20 is formed.

Figure 5:
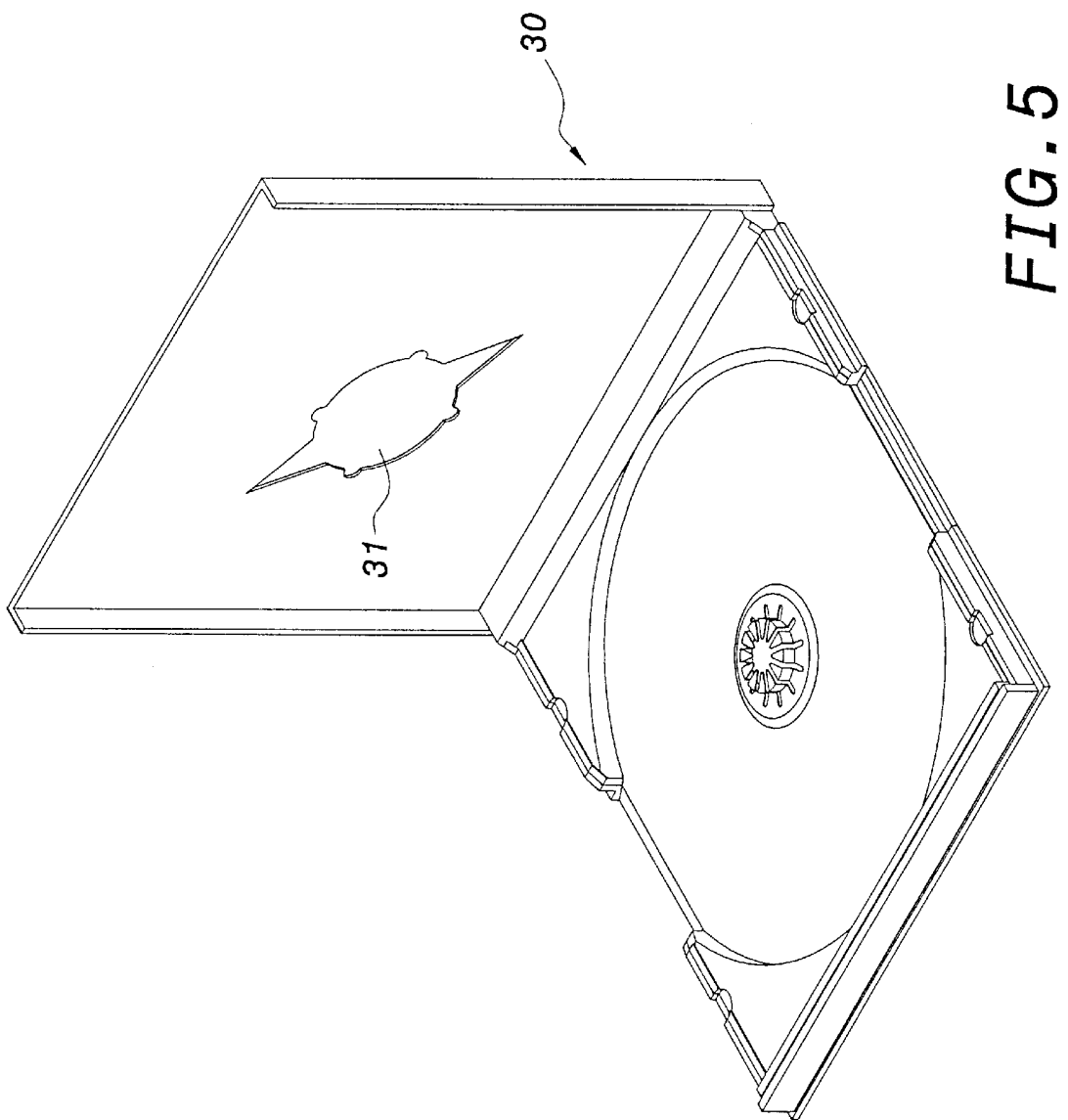
FIG. 5 is a schematic perspective view of an optic disk box formed by the present invention.

As shown in FIG. 2, in the present invention, by installing a mother plate 20 with a metal film 24 on the upper mold core 12 (or lower mold core 13), the filler plastics material is injected into the mold cavity 15 along the sprinkling path system 14, the portion of the plastics material with respect to the metal film 24 is formed as a predetermined pattern so that the shaped product has correspondent patterns (see FIG. 5). Since the mother plate 20 is replaceable, it can be replaced with other mother plate 20 with different patterns on the panel so that the shaped products have various patterns.

In the present invention, the mother plate 20 is made of glass substrate 21 having a lower cost, moreover, the manufacturing of the mother plate 20 is easy. Furthermore, the mother plate 20 is assembled to the surface of the upper mold core 12 or lower mold core 13, and therefore, the operation of assembly and update are easy and convenient. The upper mold core 12 or lower mold core 13 is unnecessary to be detached and thus, the cost is reduced greatly.

In summary, the prior art defects, such as much labor, time and cost, are necessary, but these are improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A mold structure for molding plastic articles, comprising:

a lower mold;

a lower mold core disposed in said lower mold;

an upper mold disposed above said lower mold;

an upper mold core disposed in the upper mold, said upper mold core and said lower mold core together defining a mold cavity therebetween having a predetermined contour; and, a mother plate disposed in said mold cavity and being replaceably coupled to one of said upper and lower mold cores, said mother plate carrying a pattern formed by a metal film for molding said pattern in a plastic article formed within said mold cavity.

2. The mold structure as recited in claim 1, wherein said mother plate includes a glass substrate having said metal film pattern formed thereon.

\* \* \* \* \*